United States Patent [19]

Haas

[11] 4,103,292

[45] Jul. 25, 1978

[54] MATERIAL SENSING DEVICE

[76] Inventor: James R. Haas, Old State Rd. N., Norwalk, Ohio 44857

[21] Appl. No.: 696,768

[22] Filed: Jun. 16, 1976

[51] Int. Cl.² ............................................. G08B 21/00
[52] U.S. Cl. ................................. 340/603; 200/61.21; 250/229; 307/118; 340/606; 340/617; 340/619
[58] Field of Search ............ 340/244, 246; 73/290 R, 73/293, 301, 302, DIG. 11; 250/577, 573, 229, 239, 221; 200/61.2, 61.21; 307/118

[56] References Cited

U.S. PATENT DOCUMENTS

| | | | |
|---|---|---|---|
| 781,444 | 1/1905 | Moebeck | 340/246 |
| 3,184,188 | 5/1965 | Rossire | 250/221 X |
| 3,313,946 | 4/1967 | Goodwin et al. | 340/237 S X |
| 3,526,775 | 9/1970 | Friedrich et al. | 250/221 |
| 3,550,447 | 12/1970 | Beresic | 340/246 X |
| 3,697,708 | 10/1972 | Beresic | 200/61.21 |

FOREIGN PATENT DOCUMENTS

| | | | |
|---|---|---|---|
| 636,614 | 1/1928 | France | 340/246 |
| 928,203 | 5/1955 | Fed. Rep. of Germany | 340/246 |

Primary Examiner—John W. Caldwell, Sr.
Assistant Examiner—Daniel Myer
Attorney, Agent, or Firm—W. Preston Hickey

[57] ABSTRACT

A material sensing device comprising a flexible or collapsible tube with a light sensitive device therein which receives light through the tube from a spaced apart light emitting device. The signal from the light sensitive device is amplified and used to operate a silicon controlled rectifier that snap actuates a solenoid operated switch. The invention includes an amplifying circuit in which the amplifier is the load for the silicon controlled rectifier and a generally fixed bias is provided to the gate of the SCR with the result that the circuit automatically resets the SCR during normal operation.

10 Claims, 7 Drawing Figures

MATERIAL SENSING DEVICE

BACKGROUND OF THE INVENTION

The present invention relates to a device for sensing or controlling a function of materials, including liquids, solids, and gases, and which has particular advantages in the sensing of a level or flow of solid materials. Prior to the present invention there has been no completely satisfactory means for sensing the level of solid materials such as grain, gravel, or crushed stone, in bins and the like, nor the rate of flow of such materials. The indicating and/or control circuits for stopping and starting flows of solid materials usually require quite heavy currents that in turn make snap actuation of their controlling switches highly desirable. Another problem that has existed in such circuits is that snap actuating switches of the silicon controlled rectifier type have heretofore requires separate and distinct control circuits for the gate of the rectifier, which circuits interrupt its normal operation at least momentarily to reset the silicon controlled rectifier (SCR) before the SCR can undertake its next cycle.

An object of the present invention therefore is the provision of a new and improved mechanism for sensing the level or the flow of solids, which is simple in design, rugged in its construction, and efficient in its operation, and which can be used to either indicate the presence of the solid and/or control the flow of the solid.

Another object of the invention is the provision of a new and improved control circuit for an electronic gate, the voltage drop across which increases, doubles back and increases again in generally an S-shaped curve as the through put current increases, and wherein the signal which controls the electronic gate automatically resets the electronic gate without extraneous circuitry.

A still further object of the present invention is the provision of a new and improved method for controlling a silicon controlled rectifier and the like, whereby the control signal is amplified and connected in series with the silicon controlled rectifier's power terminals while the control gate is provided with a generally constant voltage designed to limit the voltage differential between the breakover point and the reset voltage of the rectifier to fall within the negative and positive voltage swing of the amplifier.

Further objects and advantages of the invention will become apparent to those skilled in the art to which the invention relates from the following description of the preferred embodiments described with reference to the accompanying drawings forming a part of this specification.

DESCRIPTION OF THE PREFERRED EMBODIMENTS

Figure 1:
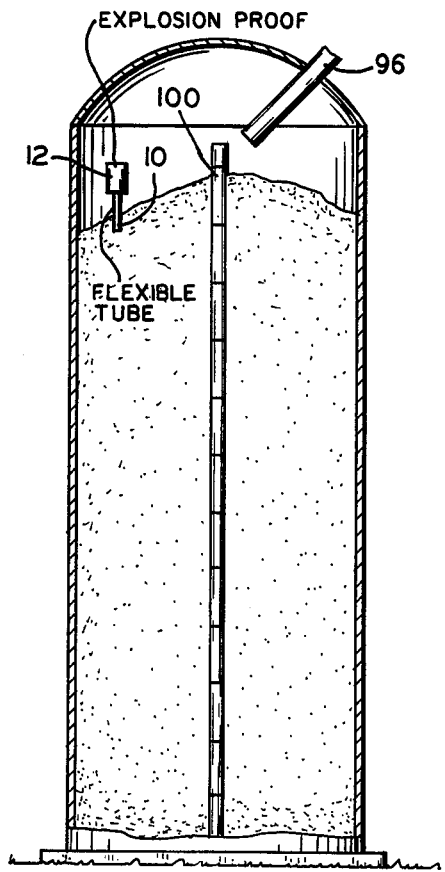
FIG. 1 is a side elevational view of a solid materials storage bin with portions broken away to show two embodiments of the invention therein.

The principles of the present invention may be used to sense flows and/or pressures of gases, liquids or solids and as shown in the drawings have particular advantages in detecting the levels of solids in bins, and the like.

According to one aspect of the invention, a light source and a light sensitive device are spaced apart in a conduit, an intermediate portion of which can be collapsed, flexed, or rotated about a hinge to attenuate the light from the source which is detected by the light sensitive device. As previously indicated solid material handling equipment usually requires sizable current handling ability so that snap actuation of a control switch is desirable. In addition heavy material handling equipment does not lend itself to modulation so that in most instances on-off control having a sizable spread between the "off" condition and the "on" condition is desirable. According to a further aspect of the invention, a unique electronic circuit is provided for accomplishing these objectives.

Figure 2:
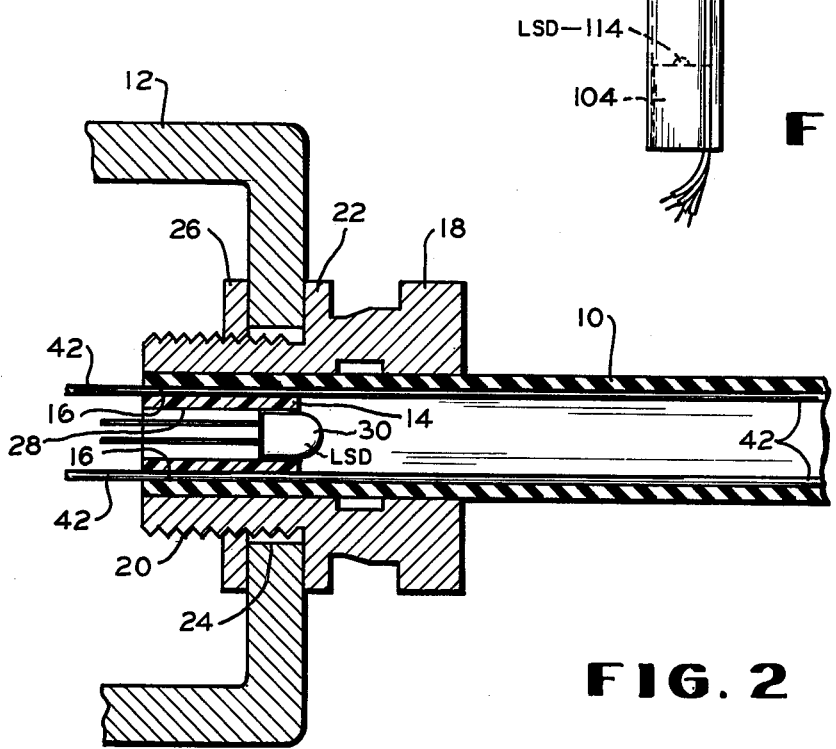
FIG. 2 is a longitudinal sectional view through one of the embodiments shown in FIG. 1.
Figure 3:
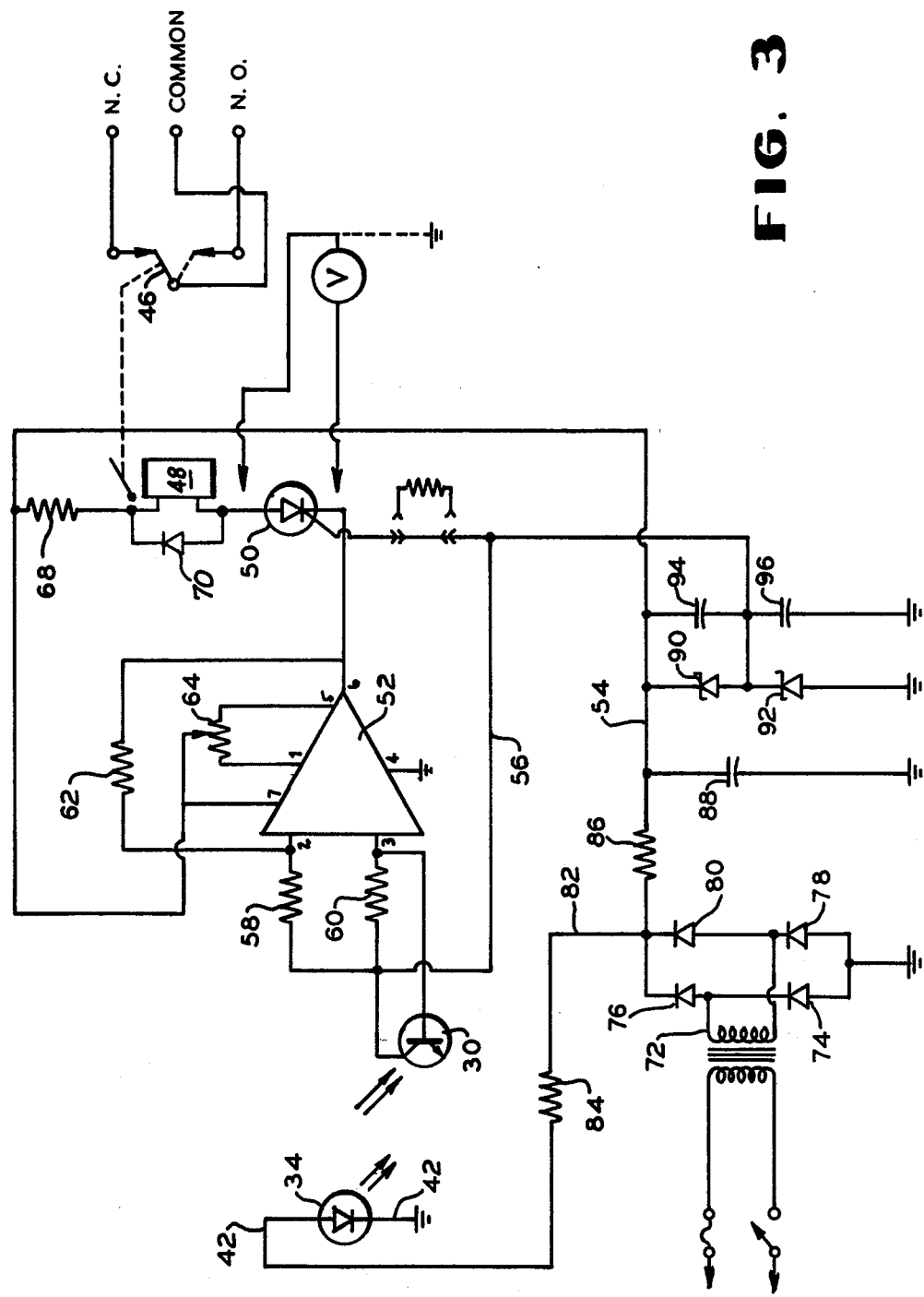
FIG. 3 is a schematic diagram of the electrical circuitry in one of the embodiments shown in FIG. 1.

In the embodiment shown in FIGS. 1, 2 and 3, the embodiment generally comprises a section of silicone rubber hose having one end mounted in an explosive proof enclosure, or junction box 12. A cylindrical polyvinyl chloride plug 14 having a pair of shallow grooves 16 running longitudinally of its exterior surface is cemented into the upper end of the hose 10, and the upper end of the hose in turn is cemented into a tube fitting 18 having a threaded boss 20 which projects axially from a radial shoulder 22. The boss extends through an opening 24 in the end wall of the junction box 12, and a jamb nut 26 is threaded onto the boss to clamp the fitting to the end wall of the enclosure. An axially extending opening 28 is provided through the plug 14 to receive a light sensitive diode (LSD) 30 which is cemented into the inner end of the opening. The opposite end of the hose 10 is sealed off by a polyvinyl chloride plug 32 that is cemented in place. The plug 32 has a cylindrical opening 34 in its inner end for receiving a light emitting diode (LED) 36 and the inner end of the plug is provided with a transverse slot 36 which projects beneath the bottom of the opening 34 to receive the leads 40 of the diode. The leads 40 in turn are connected to wires 42 which are cemented to the inner walls of the hose 10, and which extend out through the groove 16 in the plug 14.

In the straight condition of the hose, the LSD receives both direct light, and the reflected light from the LED 36, and the device provides a very desirable type of control in that minor fluctuations of the hose to either side of its straight line position produces very little change in the amount of light that is sensed by the LSD 30. Only a positive flexure of the hose, as is produced by definite material contact, will flex the hose sufficiently to produce a significant attenuation of the transmitted light, following which further flexure starts to produce a significant attenuation that is worthy of control and/or sensing. Once the direct light is cut off by the flexure of the hose, the reflected light is attenuated over a considerable movement, or flexure of the hose. The result is the initial movement of the hose from its centered position has very little effect, that a small movement thereafter has a considerable effect, and that further movement thereafter has a gradually diminishing effect. In addition, the reflectivity is dependent upon the type of material from which the hose is made, the wave length emitted by the LED 36 and the color sensitivity of the LDS 30.

In some instances, the junction box 12 may be mounted on the sidewall of the bin, and the electrical leads 42 may pass through conduit leading to an exterior location having better accessibility at which the circuitry about to be described is installed. In the embodiment shown however, the circuitry shown in FIG. 3 is mounted directly in the junction box 12. It will be understood that in some instances the position of the LED and the position of the LSD may be reversed.

As previously indicated, solid material handling equipment is quite massive so that it is usually stopped and started at least in steps instead of being modulated. This being true, both control and indicating devices for solid material flows and levels usually require on-off current flows. In the device shown in the drawing, the output signal of the device is provided by a solenoid actuated single pole double throw switch 46, the solenoid coil of which is connected in series with the power terminals of an electronic switch or gate of the snap acting type, having a breakover voltage differential which is greater than the reset differential; so that once the switch 50 starts to conduct, it will continue to conduct until the voltage drop across the switch 50 is at a very low level. In the embodiment shown in the drawing, the electronic switch 50 is a silicon controlled rectifier (SCR) the anode of which is connected to the solenoid coil 48, and the cathode of which is connected to the output terminal 6 of a linear high performance operational amplifier 52. Power for the amplifier is provided by the 18.4 volt bus 54 which is connected to terminal 7 of the amplifier, and the other power terminal 4 of the amplifier is grounded. The amplifier has an inverting input terminal 2, and a noninverting terminal 3, as well as offset null terminals 1 and 5 for varying the quiescent operating voltage, or null point, above and below which the output voltage will swing. The LSD 30 is connected in the photovoltiac mode wherein the collector is connected to the 9.2 volt bus 56, the emitter is unconnected, and the base is connected to the noninverting input terminal 3 of the amplifier. In this mode of operation, the base of the LSD 30 provides a slight positive voltage which is a direct function of the amount of light hitting the diode. In order to drive the amplifier below the null point when no light signal is received from the diode 30, a greater positive constant bias is provided to the inverting input terminal 2 than is provided to the noninverting input 3. The 9.2 volt bus 56 is connected to the terminal 2 by a 1K ohm resistor 58, and the noninverting input terminal 2 is connected to the bus 56 by a 1000 K ohm resistor 60. Because the amplifier has more sensitivity than is required, and in order to reduce instability, the output terminal 6 of the amplifier is connected to the inverting input terminal 2 through a 2000K ohm resistor 62. The amplifier shown in the drawing is a commercial Signetics* type 536 amplifier, and an exterior offset null circuit is provided by the use of a 10K ohm potentiometer, the wiper of which is connected to the 18.4 volt bus 54 and the end terminals of which are connected to the terminals 1 and 5 of the amplifier. The potentiometer 54 will usually be adjusted so that full illumination of the LSD as occurs in the straight line condition of the hose 10, produces an output voltage of the amplifier which is more positive than the reset voltage for the cathode of the SCR 50. When no light strikes the LSD 30, the output voltage of the amplifier is substantially at ground level. In the embodiment shown, the maximum output voltage of the amplifier can be changed from a maximum of approximately 18 volts to a minimum of approximately 10.3 volts by adjusting the pot. 64. This in turn changes the amount of deflection of the hose 30 that is required to cause the amplifier to produce an output signal whose voltage with respect to the anode of the rectifier 50 is just sufficiently different from the anode to cathode forward breakover voltage differential that is required to turn the SCR on. The forward breakover voltage differential can of course be decreased as the voltage that is applied to its gate is increased, and according to principles of the present invention, a generally constant positive voltage is applied to the gate of the SCR and this voltage is selected to provide the desired degree of snap actuation for the silicon controlled rectifier 50. In the embodiment shown, the 9.2 volt bus 56 is connected directly to the gate of the switch 50. In some instances, a resistor can be inserted between the bus and the gate to change the degree of snap actuation or to provide some other function, as for example to provide longer component life at high ambient temperatures. A load limiting resistor 68 is provided between the 18.4 volt bus 54 and the solenoid 48 to increase the life of the components. A diode 70 is connected in parallel with the solenoid to dissipate the surge which occurs when the switch 50 turns off.

* A tradename of the Signetics Corp.

The power supply for the circuitry above described comprises a power transformer 72, the primary coil of which is connected to 115 volt AC current, and the secondary coil of which provides a peak voltage of approximately 25.2 volts. The secondary of the transformer 72 is provided with a full wave rectifier comprising diodes 74 through 80. The anode of diode 74, as well as the anode of diode 78 are connected to ground. The cathode of diode 74 and the anode of diode 76 are connected to one terminal of the secondary coil. The other terminal of the secondary coil is connected to the cathode of the diode 78 and the anode of diode 78 is connected to the anode of diode 80. The cathodes of the diodes 76 and 80 are connected to a high voltage bus 82. A 150 ohm voltage dropping resistor 84 connects the high voltage bus 82 to the lead 42 that is connected to the anode of the LED 36. The high voltage bus 82 is also connected to the 18.4 volt bus 54 through a voltage dropping resistor 86. Ripple in the bus 54 is reduced by a condensor 88 that is connected between the bus 54 and ground. The 9.2 volts that is required for the bus 56 is provided by a voltage divider network comprising Zener diodes 90 and 92 which are connected in series between the bus 54 and ground. The cathode of Zener diode 92 is connected to the anode of Zener diode 90 and to the 9.2 volt bus 56. The break down voltage of both Zener diodes is 9.2 volts, and condensors 94 and 96 are respectively connected between the busses 54 and 56, and the bus 56 and ground to smooth out ripple.

It will now be seen that the material sensing device described above provides a snap actuation for the output switch 46 to provide "on-off" control either for an indicating device or a control device which regulates the flow of material that is sensed by the hose 10. In the embodiment shown in FIG. 1, the device is installed at the top of a grain storage bin to shut off the flow of grain to the bin as well as to actuate an indicator when its level reaches the device. The grain enters the bin through a chute 98 and produces a cone of grain which causes newly added grain to slide down the sides thereof until the grain reaches the side of the bin. As the grain approaches the level of the hose 10, the material sliding down the surface of the cone impinges upon the hose 10 to flex it sidewardly and attenuate the light passing between the LED and LSD. This causes the output voltage of the amplifier to drop to a point below the forward breakover voltage of the silicon controlled rectifier 50, causing it to switch on. Current flow through the SCR activates the solonoid 48 to swing the pole of the switch 46 into its open position — thereby shutting off the supply of grain. At this time the output of the LSD 30 is at a very low level, the amplifier output is at ground level, and the SCR 50 is conducting. The circuitry stays in this condition until the level of the grain drops below the hose 10, whereupon it straightens, and the LSD 30 again supplies a positive signal to the amplifier. The output of the amplifier then swings positive to a level above the reset voltage of the SCR 50, whereupon it switches off to cause the solonoid 48 to move the pole of the switch 46 into its closed condition to repeat the cycle. The change in the level of the grain that occurs during this cycle will of course vary with the amount of flexing that is required of the hose to cause the input signal to swing below the breakover voltage, and then above the reset voltage. By turning the pot. 64 to one of its limits, the circuitry described will require the hose to flex 30° before switching off, and to approach within 8° of its straight line position before resetting the SCR. It is a feature of the present invention that the output signal from the amplifier automatically resets the SCR 50, since it, in addition to being the control signal, automatically changes the voltage drop across the SCR to thereby automatically reset the SCR. When the pot. 64 is moved to its other extreme, the device will switch off when the hose deviates 8° from its straight line position, and will reset the SCR when it approaches within 3° of its straight line position.

It will further be understood, that where a larger change in material draw down is desired, that two of the sensing devices described can be used — the lower one of which will switch the material supply mechanism on, while the upper one will switch the supply mechanism off.

Figure 4:
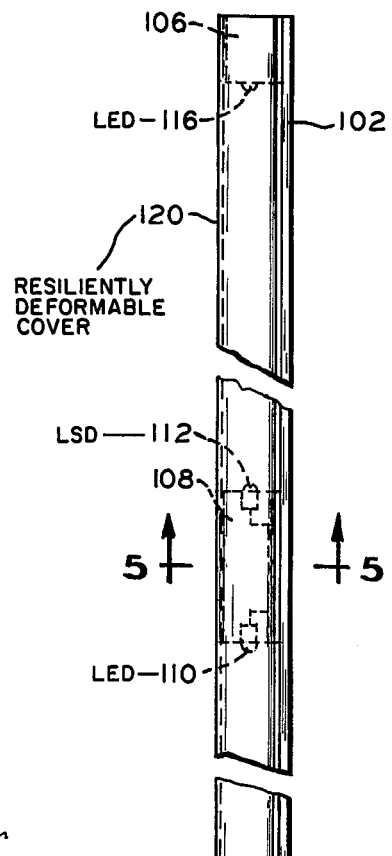
FIG. 4 is a side view of the sensing element of the second embodiment of the invention.
Figure 5:
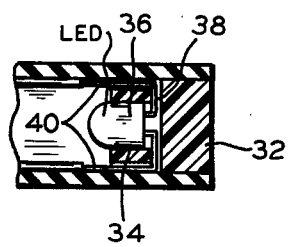
FIG. 5 is a sectional view taken approximately on the line 5—5 of FIG. 4.

FIGS. 4 and 5 of the drawings show an integrated multiple unit device that can be installed along the vertical wall of the bin to provide indication or control at a number of different vertical levels. The multiple sensing unit 100 comprises a generally rigid polyvinyl chloride backup strip 102 having half round terminal blocks 104 and 106 at its ends and one or more half round intermediate blocks 106 that are positioned between the terminal blocks 104 and 106. The intermediate blocks 108 each contain a light emitting diode 110 in one end face and a light sensitive device 112 in its opposite end face. The terminal block 104 contains a light sensitive device or photocell 114, and the terminal block 102 contains a light emitting device 116. The LEDs and the LSDs are mounted in the blocks in a manner similar to that given for the previously described embodiment, and it will be understood that the positions of the LSDs and the LEDs can be interchanged so long as the light from one LED impinges upon one or more of the LSDs. In the embodiment shown, the intermediate block or blocks 108 are provided with a flat recess 118 in their face that is positioned against the back up strip 102 to provide clearance for the electrical leads that are connected to the various LEDs and the LSDs. A flat silicon rubber strip 120 is cemented over the terminal blocks with the side edges of the strip 116 being cemented to the back up strip 102 to provide a sealed light transmitting conduit.

It will now be seen that material standing against the rubber strip 120 collapses it against the back up strip 102 to attenuate the light passing between one of its LEDs and the cooperating LSD. Each LSD is connected to a circuit of the type previously described, so that as material is added to the bin, the weight of the material will squeeze the strip 120 against the back up strip 102 to effectively shut off the LSD that is adjacent to the material interface. As the interface of the material proceeds up the bin, it progressively shuts off the light to the LSDs at progressively higher levels, and the signals produced thereby are used to control the flow of materials to the bin as well as to energize level indicating lights.

Figure 6:
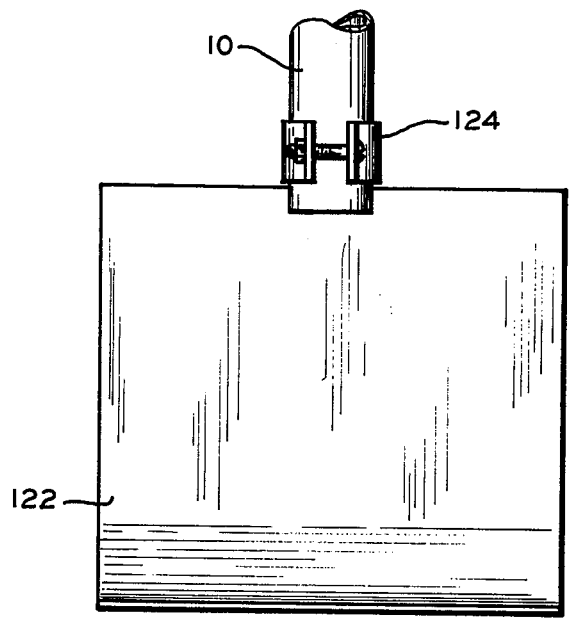
FIG. 6 is a frontelevational view of a deflector plate attached to the end of the tube of the embodiment shown in FIG. 2.
Figure 7:
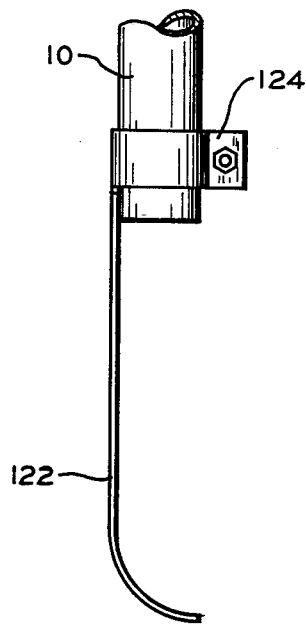
FIG. 7 is a side view of FIG. 6.

In some instances it may be desirable to attach a plate (sail) to the end of the flexible tube unit for contact by unusually light material. FIGS. 6 and 7 show a plate 122 having a clamp 124 on its upper end for clamping to the end of the flexible hose 10. A sail such as a plate or chain can also be used to absorb the impact of sharp pieces of rock etc.

It will now be seen that the sensors of the present invention can be made in many different ways since the light conducting conduits can be attenuated by bending, flexing, collapsing or can be made of a rigid material that is hinged between the cooperating LED and LSD. It will further be seen that the devices of the invention can be used to sense pressure or movement; and that the devices can be installed in explosive atmospheres, and can be subjected to the rough treatment which solid materials including crushed stone produce.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. A material sensing device comprising: a flexible light conducting tube having first and second ends, a light emitting device at said first end, a light sensitive device at said second end, said light emitting device providing both direct illumination of said light sensitive device and light which impinges on the internal walls of said tube in the straight line position of said tube, said light sensitive device being sensitive to both the direct illumination of said light emitting device and light reflected from the internal walls of said tube, one end of said flexible tube being received in a support receptacle and the other end being free, said free end of said tube being sealed off, and whereby lateral deflection of said tube from the straight line position quickly attenuates the direct transfer of light and thereafter more gradually attenuates the reflected light.

2. The material sensing device of claim 1 wherein said light emitting device is an LED and said light sensitive device is an LSD.

3. The material sensing device of claim 1 including electrical leads inside said tube running from the fixed end of said tube to the device at said free end, said leads being confined to the sidewalls of said tube in a manner which permits flexing and does not appreciably interfere with the transmission of light through said tube.

4. The material sensing device of claim 3 in which said support receptable serves as an explosion proof enclosure for electrical connections to said light emitting and light sensitive devices.

5. The material sensing device of claim 4 including: an amplifier circuit in said enclosure amplifying the signal of said light sensitive device, a power supply in said enclosure for said amplifier and said light emitting device, a relay in said enclosure, said relay being actuated by said amplifier upon attenuation of the light signal received by said light sensitive device, and a switch controlled by said relay, and whereby an explosion proof self-contained control unit is provided.

6. A material sensing device comprising: a longitudinally extending back-up member, a resiliently deformable cover the side edges of which are fixed to said back-up member, and the center portion of which is bowed outwardly from said back-up member, said center portion being resiliently deformable onto said back-up member by pressure applied to said cover and recovering to its original condition on the removal of said pressure, a light emitting device and light sensitive device spaced apart in the space between said cover and said back-up member, said light sensitive device receiving light from said light emitting device through the space between said cover and back-up member which light is attenuated by deformation of said cover against said back-up member, and a signal transmitting lead running longitudinally of said back-up member to said light sensitive device for carrying a signal responsive to the deformation of said cover.

7. The device of claim 6 comprising a plurality of pairs of said light emitting and light sensitive devices spaced longitudinally of said back-up member with separate leads to said light sensitive devices and whereby the signals in said leads are indicative of the pressure on said cover member at longitudinally spaced locations along said device.

8. The device of claim 7 wherein said light emitting devices are LED's and said light sensitive devices are LSD's.

9. The device of claim 8 wherein said devices are supported by partitions spaced longitudinally of said device between said cover member and said back-up member.

10. The device of claim 9 wherein said cover member is generally hemicylindrically shaped.

* * * * *